E. G. ODETTE.
VEHICLE TOP.
APPLICATION FILED JULY 7, 1914.
1,164,852.
Patented Dec. 21, 1915.
2 SHEETS—SHEET 1.
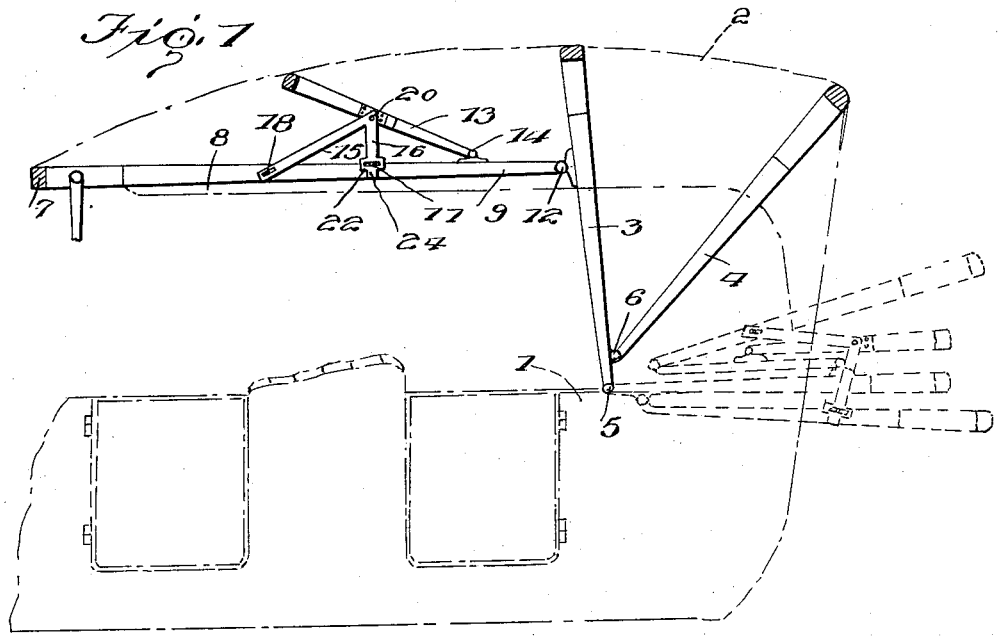
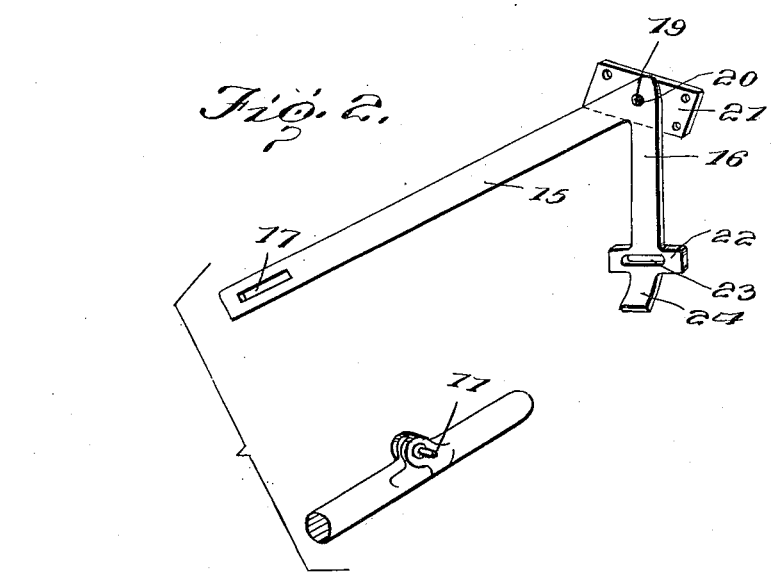
Inventor
E. G. Odette,
Witnesses
By
Attorneys E. G. ODETTE.
VEHICLE TOP.
APPLICATION FILED JULY 7, 1914.
1,164,852.
Patented Dec. 21, 1915.
2 SHEETS—SHEET 2.
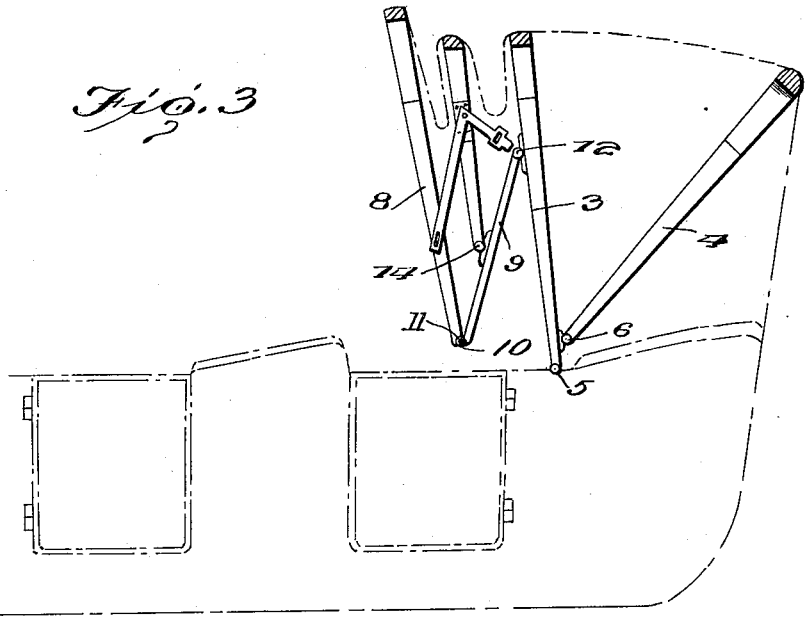
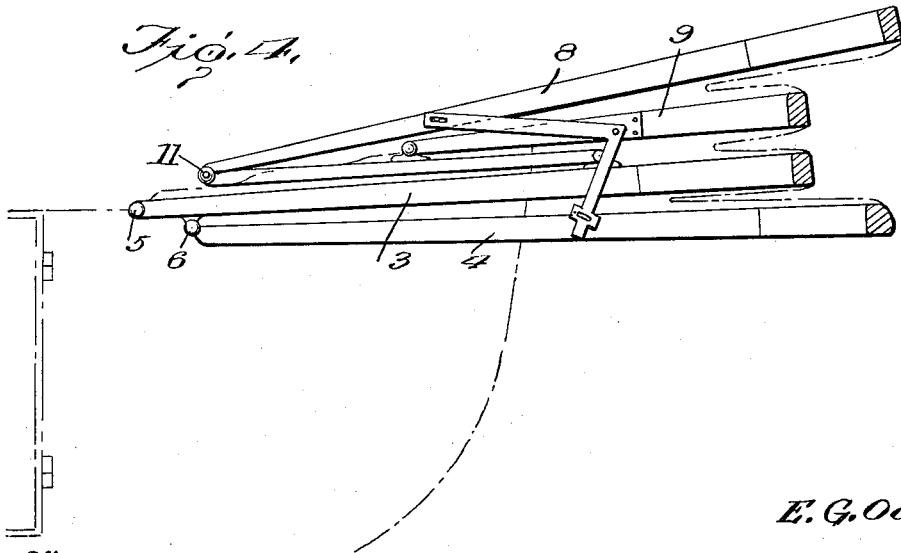
Inventor
E. G. Odette

UNITED STATES PATENT OFFICE.

EDMUND G. ODETTE, OF JACKSON, MICHIGAN.

VEHICLE-TOP.

1,164,852.   Specification of Letters Patent.   Patented Dec. 21, 1915.

Application filed July 7, 1914. Serial No. 849,533.

*To all whom it may concern:*

Be it known that I, EDMUND G. ODETTE, citizen of the United States, residing at Jackson, in the county of Jackson and State of Michigan, have invented certain new and useful Improvements in Vehicle-Tops, of which the following is a specification.

This invention relates to vehicle tops, and more particularly to an improvement in automobile tops of that type employed upon touring or other large cars. In this particular type of automobile top, bows are arranged to support the rear portion of the top, these bows being connected to the body at opposite sides of the rear seat and the forward portion of the top is supported by other bows which are detachably connected with the body of the car at opposite sides of the front seat. In raising and lowering the top, it is necessary to disconnect the last-mentioned bows from the body, which usually requires the services of two persons, and then to carry these bows rearwardly and connect them to the brackets arranged at or adjacent the points of connection of the first-mentioned or rear bows with the body. In fact, not only are the services of two persons required to raise and lower such a top, but considerable time and labor must be spent in properly doing the work.

The present invention therefore aims to provide an automobile top of the class described, in which the arrangement of the bows and the bracing means therefor is such as to obviate the use of the front supporting bows and to enable the driver of the car to raise or lower the top by himself and without the necessity of leaving the machine.

The invention aims to provide a bracing member for the bows which carry the forward portion of the top, so constructed that it may be readily manipulated to permit of the forward portion of the top being bolted back or raised and which will automatically lock when the top has been moved to raised position.

In the accompanying drawings: Figure 1 is a vertical longitudinal sectional view illustrating the top construction embodying the present invention, the top being shown raised in full lines and lowered in dotted lines. Fig. 2 is a perspective view of the bracing member employed for bracing the bows carrying the forward portion of the top. Fig. 3 is a view similar to Fig. 1, illustrating the top partly folded. Fig. 4 is a similar view, illustrating the top folded or lowered.

Corresponding and like parts are referred to in the following description and indicated in all the views of the accompanying drawings by the same reference characters.

In the drawings, the vehicle body is indicated in general by the numeral 1 and the cover of the top is indicated by the numeral 2. The cover is supported at the rear side of the top by means of bows, one indicated by the numeral 3 and the other by the numeral 4. The arms of the bow 3 are pivotally connected, as at 5, to the body at opposite sides of the rear seat, and the arms of the bow 4 are pivotally connected, as at 6, to the arms of the bow 3. These bows 3 and 4 are of the ordinary construction and the bow 3 is arranged to extend approximately vertically when the top is in raised position and the bow 4, in such position of the top, is arranged to extend upwardly and rearwardly from the bow 3. When the top is in folded position, the bow 3 is of course arranged to lie above the bow 4, as shown clearly in dotted lines in Fig. 1 and in Fig. 4. The support for the forward portion of the top includes a bow having a connecting portion 7 and spaced arms, each of which includes a section 8 and a section 9. The sections 8 and 9 are connected by means of a joint 10, the pivot for this joint being provided with a stud extension 11, the purpose of which will be presently explained. The rear ends of the arms 9 are pivotally connected, as at 12, to the arms of the bow 3 near the arch of the bow, and when the top is raised the bow 7 is extended forwardly and substantially horizontally, as shown in Fig. 1, the sections 8 and 9 of the arms of the bow being of course, in such position of the bow, in alinement. The forward side of the cover 2 is of course attached to the arch of the bow 7 and as a means for supporting that portion of the cover which extends between the arch of the said bow 7 and the arch of the bow 3, there is provided a bow 13 having its arms pivotally connected at their inner ends, as at 14, to the sections 9 of the arms of the bow 7. When the top is in raised position, the bow 13 is arranged to extend forwardly and upwardly from the bow 7 in the position clearly shown in Fig. 1 of the drawings, and in order to support the bow 13 in this position and to brace the bow 7 so that it cannot accidentally fold, there is provided a device which is clearly illustrated in Fig. 2 of the drawings and which will now be described.

Two of the bracing members, above referred to, are employed, one being located at each side of the top, and each of the members comprises two integrally connected angularly extending arms, one indicated at 15 and the other at 16. The arm 15 is the longer of the two and at its free end is provided with an opening 17 pivotally receiving a stud 18 which projects through the section 8 of the respective arm of the bow 7. At the juncture of its arms 15 and 16, each bracing member is provided with an opening 19 receiving a pivot 20 carried by an attaching plate 21 secured to the respective arm of the bow 13. The arm 16 extends at an acute angle to the arm 15 and is provided with a widened portion or head 22 near its free end, this portion being formed with a slot or opening 23 to receive the stud portion 11 of the pivot 10. Below the portion 22, the arm 16 has its terminal portion curved laterally, as at 24, so that as the top is raised, this end of the arm will ride over the stud 11 until the stud is in engagement in the slot or opening 23. The bracing member is of course formed from resilient metal.

Referring now to Fig. 1 of the drawings, it will be observed that when the top is in raised position, the stud 11 will be in engagement in the opening 23 and that the arm 15 will extend downwardly and forwardly from the bow 13, the arm 16 extending substantially vertical. Inasmuch as the arms 15 and 16 are connected respectively to the pivot 18 and stud 11, a firm support will be afforded the bow 13 and the sections 8 and 9 of the bow 7 will be prevented against accidental folding or collapse. When it is desired to lower the top, it is only necessary to spring the arms 16 inwardly so as to disengage them from the studs 11, whereupon the sections 8 and 9 may be folded with respect to each other and with respect to the bow 3. It will be obvious that this can be readily accomplished by one person and without the necessity of leaving the car.

Having thus described the invention, what is claimed as new is:

1. In a vehicle top, the combination with one of the rear bows, a jointed forward bow connected therewith and a bow connected with the forward bow, of a bracing and supporting member pivotally connected with the forward and last-mentioned bows, a stud carried by the forward bow, and means upon the bracing member coöperating with the stud to hold the jointed sections of the forward bow in alinement.

2. In a vehicle top, the combination with one of the rear bows, a jointed forward bow connected therewith and provided at its joint with a stud and a bow connected with the forward bow, of a bracing and supporting member having relatively angularly positioned arms, one of said arms being pivotally connected with the forward bow and the member at the junction of its arms being pivoted to the last-mentioned bow, and means upon the other arm of the member coöperating with the stud.

3. In a vehicle top, the combination with one of the rear bows, a jointed forward bow connected therewith and provided at its joint with a stud and a bow connected with the forward bow, of a bracing and supporting member having relatively angularly positioned arms, one of said arms being pivoted to the forward bow and the member at the juncture of its arms being pivoted to the third-mentioned bow, the other arm of the member being provided with a seat for the stud and being laterally curved adjacent the said seat.

4. In a vehicle top, a rear bow, a forward bow comprising jointed sections, a bow connected with the forward bow, a bracing member pivotally connected with the jointed forward section of the forward bow, the member being pivotally connected with the third-mentioned bow, a stud located at the joint between the sections of the forward bow, and means upon the said member detachably engaging said stud.

5. In a vehicle top, a rear bow, a forward bow having jointed sections and the rear section thereof being connected foldably with said rear bow, a bow foldably mounted upon the said rear section of the forward bow, a stud at the joint between the sections of the forward bow, a member pivoted to the third-mentioned bow and to the forward section of the forward bow, and means upon the member detachably engageable with the said stud.

In testimony whereof I affix my signature in presence of two witnesses.

EDMUND G. ODETTE. [L. S.]

Witnesses:
JOHN F. HENIGAN,
KATE A. WILLIS.

Copies of this patent may be obtained for five cents each, by addressing the "Commissioner of Patents, Washington, D. C."